Aug. 18, 1953          N. N. STRATVEIT          2,649,053
                          ROTARY MACHINE
Filed Dec. 30, 1947                            2 Sheets-Sheet 1

Inventor,
Nils N. Stratveit
By E. J. Wenderoth
Att'y

Aug. 18, 1953    N. N. STRATVEIT    2,649,053
ROTARY MACHINE
Filed Dec. 30, 1947    2 Sheets-Sheet 2
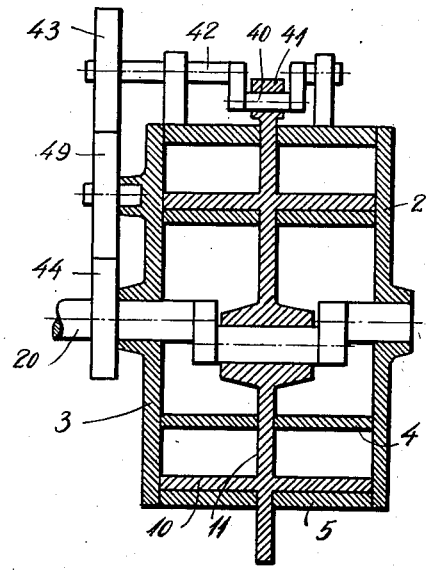
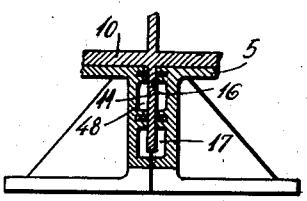
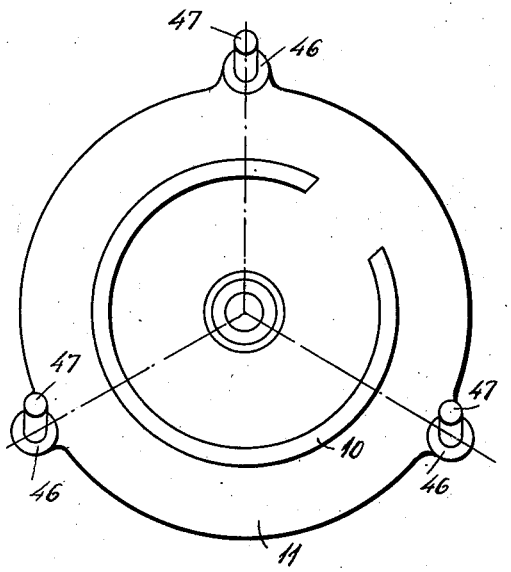
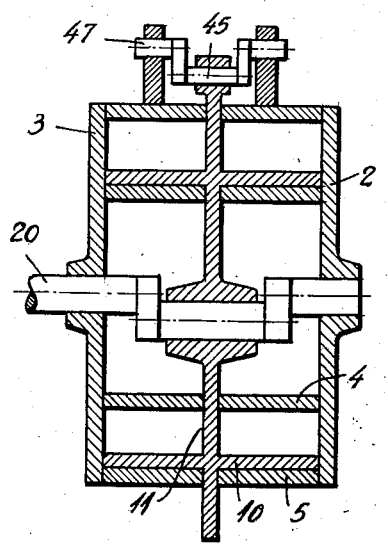
Inventor:
Nils N. Stratveit
By E. J. Wenderoth
Atty Patented Aug. 18, 1953

2,649,053

UNITED STATES PATENT OFFICE 2,649,053

ROTARY MACHINE

Nils Nilsen Stråtveit, Oslo, Norway

Application December 30, 1947, Serial No. 794,556
In Norway October 14, 1943

Section 1, Public Law 690, August 8, 1946
Patent expires October 14, 1963

7 Claims. (Cl. 103—131)

The present invention relates to rotary machines of the type having a piston that operates within a closed space formed between a wall outside of and a wall inside of the piston, and which machines also have organs governing the movements of the piston, for instance in such manner that all points on the piston describe a circular orbit of equal radii.

In the following description it is supposed that the piston is of annular shape and operates within a space between an inner and an outer cylindric wall, and that the piston is connected with a crank on the machine shaft by means of a plane disc, that is situated at right angles to the machine shaft, between the end surfaces of the piston, and extends through an annular slot in the inner and in the outer cylindric walls. However, the invention is not limited to such embodiment thereof.

The present invention more specifically refers to the construction and arrangement of the organs governing the piston movements, but also includes some other features in connection therewith.

Different arrangements for governing the piston movements in machines of the specified type have been suggested, but all of them have one or more drawbacks, and it is the object of the present invention to provide a governing arrangement that avoids such drawbacks.

In order to make the invention more clearly understood, there are shown in the accompanying drawings, means for carrying the same into practical use, without limiting the improvements in their useful application to the particular constructions illustrated for the purpose of explanation.

Figure 3:
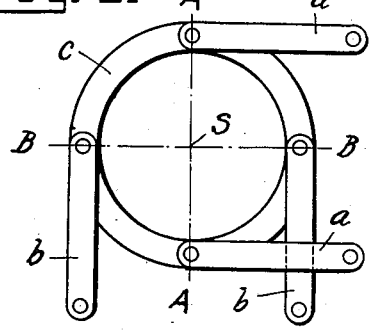
Figure 4:
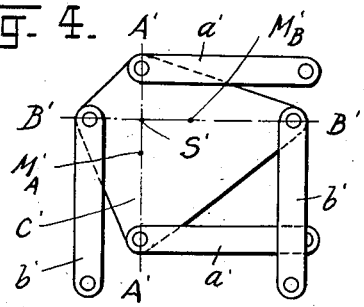
Figure 5:
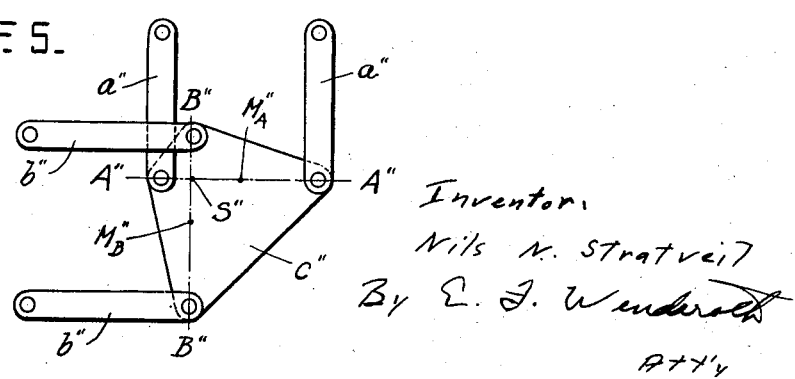

Figs. 3, 4 and 5 diagrammatically illustrate different governing mechanisms.

Figure 2:
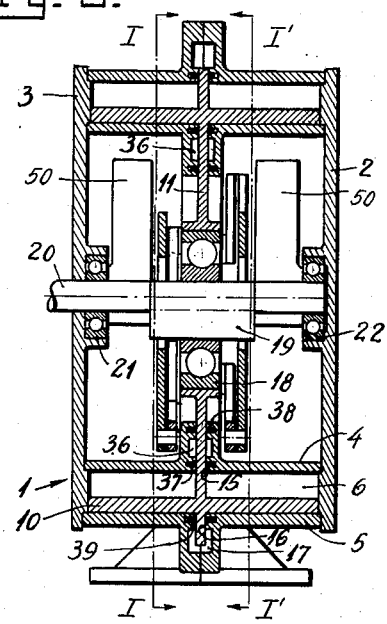
Fig. 2 shows a section taken on line II—II in Figure 1.

Fig. 6 is a diagrammatical section corresponding to Figure 2 but showing a second embodiment of the invention, and Fig. 7 is a similar section showing a third embodiment of the invention, Fig. 8 is a corresponding side view of Fig. 7, and Fig. 9 shows a detail.

Figure 1:
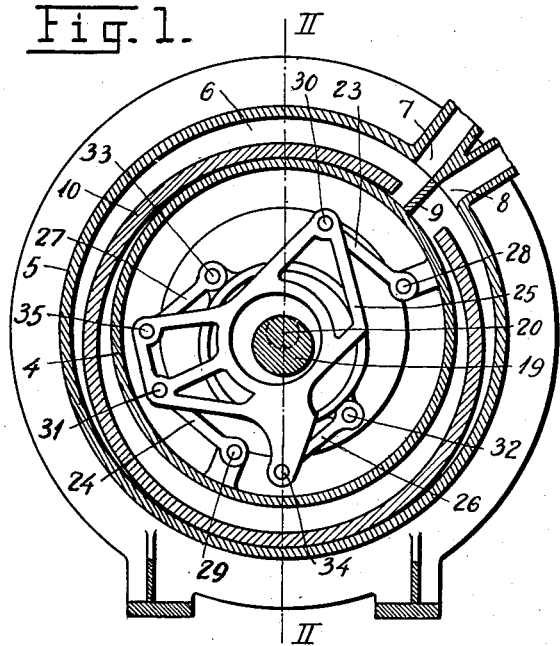
Fig. 1 is a diagrammatical view of an embodiment of a machine according to the invention, partly in section, said section being taken on line I—I in Figure 2.

The rotary machine shown in Figures 1 and 2 comprises a housing consisting of two plane end walls 2 and 3 and of two concentric cylinder walls 4 and 5 provided between the end walls. Between the two cylindrical walls is formed an annular space 6.

In the outer cylinder wall, adjacent to each other, there are provided two openings 7 and 8, leading to the suction side and to the pressure side respectively of the machine (in case the machine is used as pump or as compressor) or to outlet and to inlet conduits respectively (if the machine is used as a motor). Between the openings 7 and 8 is a radial partition 9 extending entirely over the space between the cylindrical walls 4 and 5.

The annular space 6 receives the piston 10. This piston also is annular, but has a relatively broad axial slot at the location of partition 9. This slot enables movements of the piston without being hindered by said partition.

Numeral 11 designates a plane disc which in the embodiment shown is placed midway between the end walls 2 and 3. Disc 11 extends through the piston and is rigidly secured thereto. Further, disc 11 extends through annular slots 15 and 16 provided in the inner and in the outer cylindric walls respectively. Slot 16 is closed along the circumference, so that a closed annular chamber 17 is formed.

Within the inner cylinder formed by inner cylindrical wall 4 the disc 11 is supported, through ball bearings 18, on the crank pin 19 of the driving shaft 20. The latter is supported by ball bearings 21 and 22.

In order to provide a piston movement in which all points of the piston move in circular orbits of equal diameters a link lever system or levers comprising lever members or links 23, 24, 25, 26, 27 is provided within the cylinder 4. Links or levers 23, 24 are pivotable on studs 28, 29 rigidly secured to the cylinder 4, and the other ends 30, 31 of said links or levers are pivotally connected to the member 25. Links or levers 26, 27 are linked to the disc 11 at 32, 33 and to the member 25 at 34 and 35 respectively.

In this embodiment, in which the control members are situated within the inner cylindrical wall 4, all bearings and connections needing lubrication may be lubricated in a very simple manner, since the space inside of the wall 4 may be closed and used as an oil container. During operation of the machine, the oil in said container is whirled up, say by means of balancing weights 50 provided on the shaft 20. Thus the bearing 18 of crank 19, the bearings 21 and 22 of the machine shaft 20 and the several link connections 28, 29 etc. are continuously and effectively lubricated.

In this embodiment of the machine it is as a rule desirable to prevent leakage of gas from the operation chamber 6 into the space inside of the cylindrical wall 4. For this purpose slot 15, through which extends disc 11 suitably, suitably so arranged that gas leaking from the outside of the cylindrical wall 4 to the inner side thereof must first pass through a chamber 36, from which the gas may be extracted, for instance by the chamber communicating with the atmosphere. At the same time tightening organs 37, 38, preferably resilient and adjustable, may be provided on the parts stationary within said slot.

When a parallel-system of links or levers is used for governing the piston, it is possible that said system is non-symmetrical and has its links directed inwards, which is the case of Figure 1.

For an explanation of what is meant by a non-symmetrical system the links of which extend inwards, reference is made to the diagrammatical Figures 3, 4 and 5.

On Figure 3 $a$—$a$ is the link couple the ends of which are pivotally connected to stationary parts, for instance to the inner cylindrical wall 4. Links $a$—$a$ thus correspond to links 23, 24 on Figure 1.

$b$—$b$ designate the other link couple, and correspond to links 26, 27 on Figure 1. $c$ is a central organ or common member (member 25 on Figure 1) with which both link couples are connected at points A—A and B—B respectively.

Point S, in which intersect lines interconnecting points A—A and points B—B respectively coincides with the central point of each of these lines. This means that the linkage of Figure 3 is symmetrical. Here it is irrelevant whether links $a$—$a$ are directed towards the right as shown, or towards the left, or whether links $b$—$b$ are directed downwards, as shown, or upwards.

Figure 4 shows a non-symmetrical link system. The same letter designations are used as in Figure 3, only with the difference that the letters are indexed. In Figure 4 the point of intersection S' of lines A'—A' and B'—B' does not coincide with the center point $M'_A$ of line A'—A' nor with the center point $M'_B$ of line B'—B'. Further it is seen that links $a'$—$a'$ extend toward that side of line A'—A' on which the central point $M'_B$ is located, and that links $b'$—$b'$ extend toward that side of line B'—B' on which the central point $M'_A$ is located. This means that the links are directed inwards. The link system of Figure 4 corresponds to that of Figure 1.

Figure 5 illustrates a non-symmetrical link system in which the links are extending outwards. A full explanation of this figure is deemed unnecessary in view of that already given in connection with Figure 4.

As above mentioned a link system according to the invention suitably is non-symmetrical and has its links directed inwards. However, a semi-symmetrical link system the links of which extend inwards may be used. A semi-symmetrical link system is a system in which the intersection of the two connection lines A—A and B—B coincides with the central point of one of said lines, but not with that of the other line. In such semi-symmetrical arrangement the links corresponding to that connection line the midpoint of which coincides with said point of intersection, should be directed towards that side of the companion connection line on which the mid-point of the other connection line is located. The other two links may extend in either direction, at will.

If an entirely non-symmetrical link system is used the central organ $c$ should, in accordance with the invention, be so constructed that vibrations due to mass forces are reduced to a minimum. This may be achieved by distributing the masses of the central organ C' (and of members rigidly connected with C') in such manner that the direction of the resultant of the mass force from C' (and from members rigidly connected with C') and the mass force transmitted from C' to those links ($a'$—$a'$) the other ends of which are attached to stationary members, entirely or approximately goes through the mid-point ($M'_B$) of the connection line (B'—B') between the attachment points on organ C' of those links ($b'$—$b'$) the other ends of which are secured to the piston.

According to the invention the governing organs also may be situated outside of the outer cylindrical wall 5, if desired. Such an arrangement is shown on Figure 6. In this figure the numerals 2, 3, 4, 5, 10, 11 and 20 refers to parts corresponding to those having similar numerals in Figures 1 and 2. Outside of the outer cylindrical wall 5 there is provided a crank pin 40 extending through a bearing 41 provided in the disc. The shaft 42 of said crank pin is driven by a gear 43 meshing with a gear 49 and the latter meshing with a gear 44 secured to the machine shaft 20 so that shaft 42 is driven in synchronism with shaft 20. Thus a positive governing of crank pin 40 is obtained.

Figures 7 and 8 disclose a definite arrangement in which the governing organs of the piston are located outside of the outer cylindrical wall, but where said governing organs do not have positive drive directly from the machine shaft. In these figures numerals 2, 3, 4, 5, 10, 11 and 20 correspond to similarly numbered parts in Figures 1 and 2. According to Figures 7 and 8 three crank pins 45, received in bearings 46, are distributed at equal distances between them around the circumference of disc 11. In this embodiment the crank shafts 47 are free to rotate and are not driven from the machine shaft 20.

In those embodiments where the governing organs of the piston are located outside of the outer cylindrical wall, and where between the piston ends there is provided a radial disc extending through said outer cylindrical wall, it will be suitable that that space into which the disc extends outside of said wall is a closed space, in which the governing organs are located. In such case it may be of importance to prevent leakage of gas from the operation chamber into said closed space outside of the outer cylindrical wall. For this purpose it is suitable to so construct the slot in the outer cylindrical wall, through which slot the disc extends, that gas that leaks out must—prior to entering the closed space in which the governing organs are located—pass a chamber from which such gas may be drained, for instance by said chamber being in communication with the atmosphere. Thus leakage gas will not at all enter the closed space where the governing organs or the bearings are located. Such an arrangement is shown in Figure 9. Here 10 is part of the piston and 11 part of the disc that extends through a slot 16 in the outer cylindrical wall 5. In the closed space 17 there are located the governing organs. Gas that leaks through slot 16 must pass a chamber 48 before it can enter space 17. In the slot may be secured tightening organs to the stationary parts, as shown.

I claim:

1. A rotary machine comprising a closed casing with inlet and outlet openings, said casing having a working space limited by spaced concentric cylinder walls, partition means between said inlet and outlet openings in said working space separating the outlet side of the working space from the inlet side thereof, a piston adapted to operate in the said casing between the said cylinder walls, said piston being slotted for movement about said partition means, a drive shaft rotatably journalled in said casing, means adapted to transmit the working movements of the said piston, said means connecting said piston to said drive-shaft, controlling means adapted to govern the movements of said piston being connected to the said casing and the said piston, and being positioned outside the said working space, and inside the innermost surface of the working space.

2. A rotary machine comprising a casing, spaced concentric cylinder walls in said casing defining a cylindrical closed working space therebetween and said casing, said casing having inlet and outlet openings therein for said closed space, a drive shaft rotatably journalled in said casing, an annular piston in said closed space, partition means in said closed working space between said inlet and outlet openings dividing said space into low and high pressure compartments, means eccentrically and movably connecting said drive shaft and said piston and adapted to transmit working movements of said piston, controlling means connected to said casing and said piston for governing the movements of said piston in said cylindrical working space, said piston being slotted for movement about said partition means, said controlling means being positioned outside said working space and inside the innermost surface of said working space.

3. A rotary machine comprising a casing, said casing being formed of two spaced concentric cylinders and end walls to form a closed working space between said concentric cylinders, said casing having inlet and outlet openings to said working space, a cylindrical piston in said closed space, partition means in said working space between said inlet and outlet openings dividing said space into low and high pressure chambers, a disc rigidly attached to said piston and extending through the inner of said concentric cylinders, said piston being slotted for movement about said partition means, lever members operatively connected to said disc for governing the movements of said piston, a drive shaft rotatably journalled in said casing externally of said working space, a crank end eccentrically mounted on said drive shaft, said disc being supported on said crank end, said lever members constituting a link mechanism for governing the movements of said piston whereby all points of the piston move in circular orbits of equal radii, said lever members being located externally of the working space and inside the innermost of said concentric cylinders adjacent said drive shaft.

4. A rotary machine as claimed in claim 3, means defining a gas trap chamber on the inner of said concentric cylinders extending peripherally around the innermost surface thereof outside the working space, said disc connected to said piston passing through said gas trap chamber in sealing relation therewith and said gas trap chamber being in communication with the atmosphere whereby gas leaking from the working space towards the space containing the governing organs can be exhausted.

5. A rotary machine comprising a casing, said casing comprising spaced concentric cylinder walls, end walls on said casing, said concentric cylinder walls and said end walls defining therebetween an annular working chamber, said casing having inlet and outlet openings to said working space, partition means in said working space between said openings dividing said space into low and high pressure compartments, an annular piston in said chamber, said piston being slotted for movement about said partition means, the inner of said cylinder walls having an annular slot therethrough, a disc rigidly secured to said piston and extending inwardly through said annular slot, a drive shaft rotatably journalled in said casing, said disc being eccentrically mounted on said shaft, a lever system operatively connected to said disc and to said casing for controlling the movements of said piston, said lever system being located internally of the inner surface of the innermost one of said concentric cylinder walls and externally of the working space.

6. A rotary machine as claimed in claim 2, in which the controlling means comprises two pairs of links, the ends of one link pair being pivoted on stationary parts of said machine, a member common to each said link pair, the other ends of said one link pair being linked to said member common to each said link pair, the ends of the second link pair being pivoted on the piston, the other ends of said second link pair being linked to said common member, and where the intersection of a line interconnecting those points on the common member at which the first mentioned link pair is pivoted and of a line interconnecting those points on the common member at which the second mentioned link pair is pivoted, does not coincide with the mid-point of any of said interconnecting lines, and the links of each pair are directed towards that side of the interconnecting line of each pair on which is located the mid-point of the interconnecting line of the other link pair.

7. A rotary machine as claimed in claim 2, in which the controlling means comprises two pairs of links, the ends of one link pair being pivoted on stationary parts of said machine, a member common to each said link pair, the other ends of said one link pair being linked to said member common to each link pair, the ends of the second link pair being pivoted on the piston, the other ends of said second link pair being linked to said common member and where the intersection of a line interconnecting those points on the common member at which the first mentioned link pair is pivoted and of a line interconnecting those points on the common member at which the second mentioned link pair is pivoted, does not coincide with the mid-point of any of said interconnecting lines, the mass of said common member, and of members rigidly secured thereto, being so distributed that the direction of the resultant of the mass force from said common member and of the mass force transmitted from those links the other ends of which are attached to said stationary parts of the machine, extends substantially through the mid-point of a line interconnecting the attachment points on the common member of those links the other ends of which are attached to the piston.

NILS NILSEN STRÅTVEIT.

(References on following page)

References Cited in the file of this patent

UNITED STATES PATENTS

| Number | Name | Date |
|---|---|---|
| 196,732 | Winkler | Oct. 30, 1877 |
| 385,832 | Allyn | July 10, 1888 |
| 1,378,065 | Varley | May 17, 1921 |
| 1,560,624 | Varley | Nov. 10, 1925 |
| 1,679,592 | Williams | Aug. 7, 1928 |

FOREIGN PATENTS

| Number | Country | Date |
|---|---|---|
| 209,213 | Switzerland | May 1, 1941 |
| 377,906 | France | 1907 |
| 522,609 | France | Apr. 2, 1921 |